May 5, 1936.  J. W. CAMPBELL  2,039,475
FLEXUOUSLY COMPACTED CONDUCTOR
Original Filed July 28, 1932
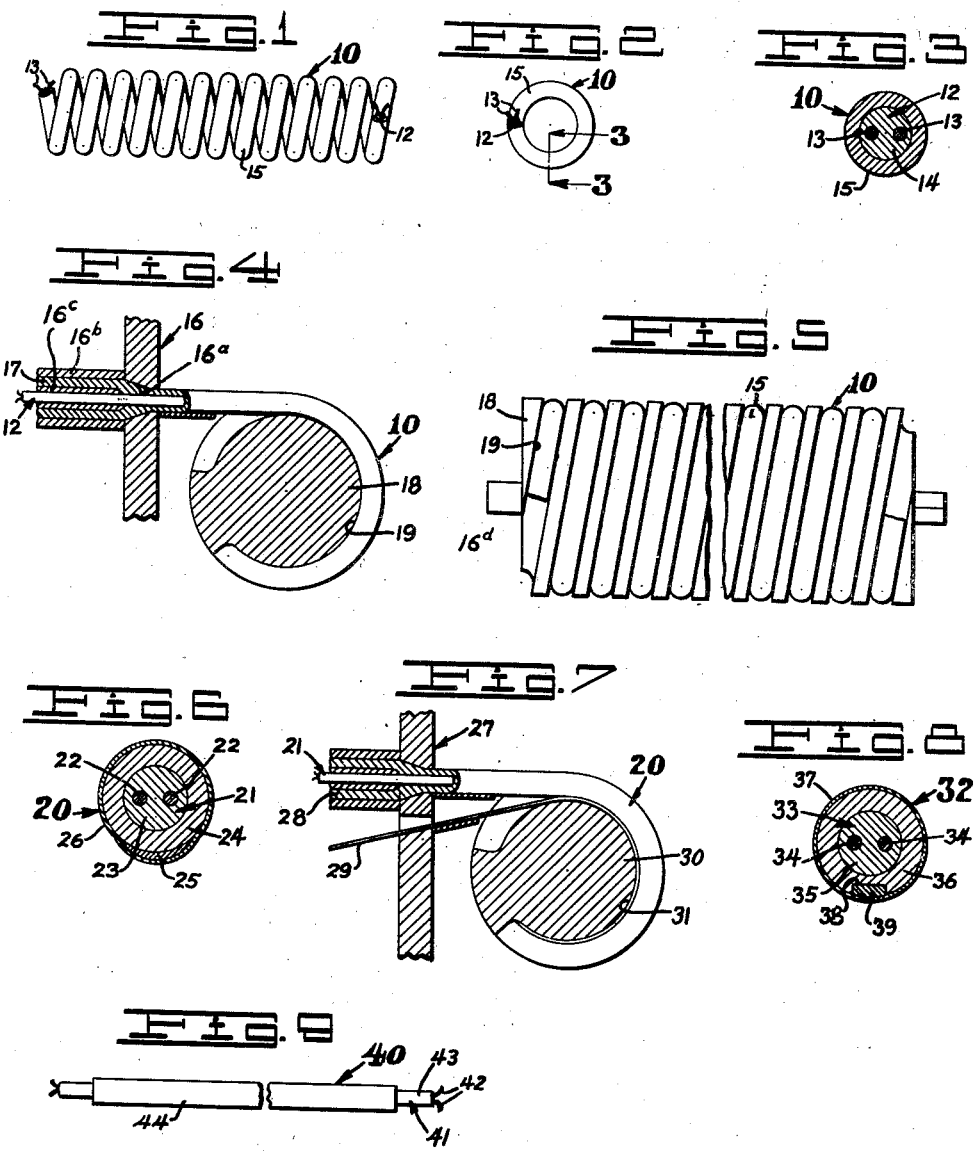
INVENTOR.
John W. Campbell
BY
ATTORNEY.

Patented May 5, 1936

2,039,475

UNITED STATES PATENT OFFICE 2,039,475

FLEXUOUSLY COMPACTED CONDUCTOR

John W. Campbell, Los Angeles, Calif.

Application July 28, 1932, Serial No. 625,410
Renewed September 25, 1935

1 Claim. (Cl. 173—367)

This invention relates to improvements in flexuously compacted conductors.

The general object of the invention is to provide an electric conductive cable which is formed in spiral shape and may be extended by flattening out the coils which will, when the cable is released, again assume their original position.

Another object of the invention is to provide a coiled electric conductive cable which is formed by coating a plurality of insulated electric conductive wires with rubber and winding the resultant product on a mandrel in spiral formation, then curing the product on the mandrel and thereafter removing the product from the mandrel.

Other objects and the advantages of this invention will be apparent from the following description taken in connection with the accompanying drawing wherein:

Fig. 1 is a side elevation of my improved electrical conductive cable.

Fig. 2 is an end view of the cable.

Fig. 3 is an enlarged section taken on line 3—3 of Fig. 2.

Fig. 4 is a fragmentary sectional view showing a machine for forming my improved cable.

Fig. 5 is a fragmentary side elevation of the mandrel used in forming my improved cable.

Fig. 6 is a view similar to Fig. 3 showing a modified form of my invention.

Fig. 7 is a view similar to Fig. 4 showing a machine for forming the modification shown in Fig. 6.

Fig. 8 is a view similar to Fig. 6 showing a further modification of my invention.

Fig. 9 is a fragmentary side elevation of a further modified form of my invention.

Referring to the drawing by reference characters I have indicated my improved electrical conductive cable generally at 10. As shown the device 10 comprises an electrical conductive cord 12 which includes a plurality of electrical conductive wires 13 which are encased in and insulated from each other by a casing 14 which is made of a pliable insulating material such as rubber. The cord 12 may be of any standard make and may include as many wires 13 as desired. Surrounding the casing 14 of the cord 12 I provide a rubber housing 15.

In making the device 10 the cord 12 is fed into a suitable forming machine such as indicated at 16 in Fig. 4 wherein a coating of raw rubber 17 is formed around the cord 12 to form the housing 15. After the raw rubber 17 has been positioned on the cord 12 the resultant product is fed onto a rotating mandrel 18 having a continuous spiral groove 19 therein in which the product is wound. When the groove of the mandrel is filled the mandrel is removed from the machine and placed in an oven wherein the raw rubber 17 forming the housing 15 is cured to the desired degree. After the raw rubber is cured the device is removed from the mandrel and thereafter normally retains its coiled shape as shown in Fig. 1.

In use such as when the device 10 is operatively connected to suitable appliances to convey electric current from a source thereof to an electric iron when the iron is moved away from source of power the coils of the device 10 will flatten out thereby allowing free movement of the iron and when the iron is moved in the opposite direction the tension of the material of the cable housing 15 returns the device 10 to its initial coiled shape.

In Fig. 6 I have indicated a slightly modified form of my invention generally at 20. The device 20 includes an electrical conductive cord 21 which is similar to the cord 12 of the device 10 and comprises a plurality of electrical conductive wires 22 which are encased in and insulated from each other by a casing 23 which is made of a pliable insulated material such as rubber. Surrounding the casing 23 I provide a rubber housing 24 similar to the housing 15 of the device 10. Secured to the outer face of the housing 24 I provide a pad member 25 which is formed of rubber of a harder consistency than the rubber which forms the housing 24. Surrounding the housing 24 and covering the pad 25 I have shown a covering 26 which is formed of braided material such as cotton threads etc.

In making the device 20 the cord 21 is fed into a suitable forming machine such as indicated at 27 in Fig. 7 similar to the one shown in Fig. 4. In the machine 27 a coating of raw rubber 28 is formed around the cord 21 to form the housing 24. After the raw rubber has been positioned on the cord 12 the resultant product and strip of raw rubber 29 which forms the pad 25 is fed onto a rotating mandrel 30 having a continuous spiral groove 31 therein similar to the groove 19 of the mandrel 18. The raw rubber 29 which forms the pad 25 is fed onto the mandrel 30 so that it engages the housing 24 on the inside of the coils thereof.

When the mandrel 30 is filled it is removed from the machine 27 and placed in an oven wherein the raw rubber 28 and 29 is cured and at the same time the rubber 29 becomes vulcanized to the rubber 28. After the device is cured to the desired degree it is removed from the mandrel 30 and thereafter normally retains a coiled shape similar to the shape of the device 10 shown in Fig. 1. After the device has been removed from the mandrel 30 it is run through a circular braiding machine (not shown) wherein the cover 26 is formed thereon.

By providing the hard rubber pad 25 the coils of the device 20 are stiffer than the coils of the device 10 and require a greater pull to flatten them and consequently a greater tension is put on the coils which returns them to their initial position when the strain thereon is released quicker than the coils of the device 10 return to their initial position.

In Fig. 8 I have indicated a further modified form of my invention generally at 32. As shown the device 32 includes an electrical conductive cord 33 which is similar to the cord 12 of the device 10 and comprises a plurality of electrical conductive wires 34 which are encased in and insulated from each other by a casing 35 which is made of a pliable insulating material such as rubber. Surrounding the casing 35 I provide a housing 36 and surrounding the housing 36 I provide a covering 37 which is formed of a braided material.

The housing 36 is formed of a rubber tubing having a longitudinally extending recess 38 in the outer surface thereof. In making the device 32 the cord 33 is positioned in the housing 36 and then a rubber strip 39 is stretched to a predetermined degree and positioned in the groove 37 and chemically vulcanized to the housing 36 while still stretched. After the strip 39 has become securely connected to the housing 36 the tension on the strip 39 is released whereupon it tends to resume its initial unstretched length and in so doing forms the device 32 into coil shape similar to the shape of the device 10.

In Fig. 9 I have indicated another modified form of my invention generally at 40. The device 40 includes an electrical conductive cord 41 which is similar to the cord 12 of the device 10 and comprises a plurality of electrical conductive wires 42 which are encased in and insulated from each other by a casing 43 formed of a pliable insulating material such as rubber. Surrounding the casing 43 I provide a housing 44 which is formed of a rubber tube.

In making the device 40 the cord 41 is positioned in the rubber tube 44 and then the device is spirally wound on a mandrel similar to the mandrel 18 whereon it is suitably vulcanized to the desired degree. After the device has been vulcanized it is removed from the mandrel and thereafter normally retains a coiled shape similar to the shape of the device 10 as shown in Fig. 1.

In the machine shown in Figs. 4 and 5 the orifice 16$^a$ is tapered and about this orifice is a cylinder 16$^b$. A second cylinder 16$^c$ is within and concentric with the cylinder 16$^b$. The cable 12 is fed through the cylinder 16$^c$ while the rubber material is fed through the cylinder 16$^b$. The shaft 16$^d$ of the mandrel 18 rotates at a speed so that its surface moves at the same rate as that at which the cable with its covering is extruded.

From the foregoing description it will be apparent that I have provided a novel electrical conductive cable which is simple in construction and highly efficient in use.

Having thus described my invention, I claim:

An electrical cable including an inner flexible helical core, said core comprising a flexible electrical conductor having a flexible insulating covering completely surrounding the same, an outer helical rubber member completely covering and surrounding said helical core, a rubber pad extending along the outer surface of the outer helical member, said inner helical core, said outer helical member and said pad having the same centerline, said rubber member and said rubber pad being vulcanized in said helical shape and said rubber member being relatively thick with respect to the core, said rubber pad being of harder rubber than the rubber of the outer rubber member whereby the elasticity of the member and pad permits said conductor to be extended when pulled and returns said conductor to a helical shape when released.

JOHN W. CAMPBELL.